United States Patent
Lenox (10) Patent No.: US 8,215,071 B2
(45) Date of Patent: Jul. 10, 2012

(54) INTEGRATED COMPOSITION SHINGLE PV SYSTEM

(75) Inventor: Carl J. S. Lenox, Oakland, CA (US)

(73) Assignee: SunPower Corporation, San Jose, CA (US)

(*) Notice: Subject to any disclaimer, the term of this patent is extended or adjusted under 35 U.S.C. 154(b) by 0 days.

(21) Appl. No.: 13/019,931

(22) Filed: Feb. 2, 2011

(65) Prior Publication Data

US 2011/0185652 A1  Aug. 4, 2011

Related U.S. Application Data (60) Provisional application No. 61/300,759, filed on Feb. 2, 2010.

(51) Int. Cl.
*E04B 2/00* (2006.01)
*H01L 31/042* (2006.01)

(52) U.S. Cl. .................................................. 52/173.3

(58) Field of Classification Search ............... 52/173.3, 52/200, 22, 251, 586.1, 586.2, 582.1, 656.1, 52/665; 136/244, 251; 126/704, 623; 403/292
See application file for complete search history.

(56) References Cited

U.S. PATENT DOCUMENTS

| | | | |
|---|---|---|---|
| 359,959 | A | 3/1887 | Cortright |
| 3,769,091 | A | 10/1973 | Leinkram et al. |
| 4,040,867 | A | 8/1977 | Forestieri et al. |
| 4,936,063 | A | 6/1990 | Humphrey |
| 5,056,288 | A | 10/1991 | Funaki |
| 5,112,408 | A | 5/1992 | Melchior |
| 5,232,518 | A | 8/1993 | Nath et al. |
| 5,575,861 | A | 11/1996 | Younan et al. |
| 5,590,495 | A | 1/1997 | Bressler et al. |
| 5,613,337 | A | 3/1997 | Plath et al. |
| 5,746,839 | A * | 5/1998 | Dinwoodie ............ 136/251 |
| 5,968,287 | A | 10/1999 | Nath |
| 5,990,414 | A | 11/1999 | Posnansky |
| 6,173,546 | B1 | 1/2001 | Schafer |
| 6,463,708 | B1 | 10/2002 | Anderson |
| 6,883,290 | B2 | 4/2005 | Dinwoodie |
| 7,155,870 | B2 | 1/2007 | Almy |
| 7,178,295 | B2 | 2/2007 | Dinwoodie |
| 2003/0154666 | A1 | 8/2003 | Dinwoodie |
| 2003/0154667 | A1 | 8/2003 | Dinwoodie |
| 2006/0266405 | A1 | 11/2006 | Lenox |
| 2007/0251567 | A1 * | 11/2007 | Plaisted ................ 136/244 |
| 2008/0190047 | A1 * | 8/2008 | Allen .................... 52/173.3 |
| 2008/0313976 | A1 * | 12/2008 | Allen .................... 52/173.1 |

(Continued)

OTHER PUBLICATIONS

Dow Building Solutions; Dow Powerhouse; 2 pages; Jan. 19, 2010.

(Continued)

*Primary Examiner* — Mark Wendell
(74) *Attorney, Agent, or Firm* — Knobbe, Martens, Olson & Bear, LLP (57) ABSTRACT

An integrated composition shingle PV system is interengageable with composition shingles, the composition shingles being arranged in overlapping rows on an inclined support surface. The system comprises a carrier mountable on the support surface. The carrier has flashing along its peripheral edge. The rear flashing is positionable under a first row of overlapping rows of composition shingles. The left side and right side flashing are interengageable with second and third rows of overlapping rows of composition shingles. The front flashing is positionable on top of another row of overlapping rows of composite shingles. A PV laminate is secured to and supported by the carrier.

12 Claims, 10 Drawing Sheets

U.S. PATENT DOCUMENTS

2010/0313499 A1* 12/2010 Gangemi ............ 52/173.3
2010/0313501 A1* 12/2010 Gangemi ............ 52/173.3

OTHER PUBLICATIONS

Uni-Solar, ovonics@work; Solar Shingles SHR-17 Sell Sheet; copyright 2004 United Solar Ovonic; 2 pages.

Sharp 62 Watt Shingle Panel product description; from www.spheralsolar.com; found Jan. 2, 2010; 2 pages.

* cited by examiner

INTEGRATED COMPOSITION SHINGLE PV SYSTEM

CROSS-REFERENCE TO RELATED APPLICATIONS

This application claims the benefit of U.S. provisional patent application No. 61/300,759 filed 2 Feb. 2010.

BACKGROUND OF THE INVENTION

This application is related to photovoltaic (PV) installation, in particular a PV system used with composition roof shingles.

Roof shingles are commonly used to cover roofing surfaces. The roof shingles are typically flat rectangular elements mounted to the roofing surface starting at the lower edge of the roof. The shingles arranged in rows with the side edges of the shingles of each row adjacent one another. The shingles are commonly nailed to the roofing surface along the upper edges of the shingles. Each additional row overlaps about one third of the lower row thus covering the nails.

Shingles have been made from many different types of materials. Some of the materials are relatively rigid, such as wood, metal, slate, asbestos-cement or ceramic. Other materials used for shingles are somewhat flexible; the most common of these are composition shingles, commonly referred to as asphalt shingles. Composition shingles are typically made of fiberglass, asphalt and aggregate. Laminated composition shingles are typically made of multiple layers of material, usually arranged for an aesthetically pleasing look.

Conventional PV systems on composition shingle roofs typically consist of rigid, aluminum framed PV modules attached to mounting systems which are in turn structurally secured to the roof. This leads to challenges in waterproofing (requiring separate flashing systems), aesthetics (systems attached to or above roofs inevitably appear to not belong there), and cost. In addition, they require specialized skills to install.

Some building-integrated products solve many of these problems with other roof types; but asphalt shingle roofs are particularly difficult because the roof coverings are quite thin (around ¾" maximum stack height). This limits the available depth to achieve structural rigidity of the PV module, ventilation, and space for wiring. Also, PV modules tend to become more costly on a per-watt basis as their physical size becomes smaller. Because the shingle sheets of asphalt shingle are relatively small, using the same form factor for the PV module is expensive. One known attempt to produce a module that integrates cleanly with asphalt shingles is the Uni-Solar solar shingle, model SHR-17, from United Solar Ovonic LLC of Auburn Hills, Mich. This solar shingle is used to replace a portion of a single row of shingles. One example of this product has a length of 86.4 inches and a height of 12 inches. The active PV area occupies less than 50% of the surface. Therefore, it also has a relatively small form factor compared to conventional PV modules. In addition, because the photovoltaic portion of a conventional solar shingle is attached directly to the roofing surface, there is nowhere to run wiring. Thus many holes must be drilled in the waterproofing felt and roof deck and wiring completed in the attic. This requires a large amount of labor and compromises the waterproofing integrity of the roof. Also this configuration does not allow for any backside ventilation of the module, leading to high operating temperatures.

BRIEF SUMMARY OF THE INVENTION

An example of an integrated composition shingle photovoltaic (PV) system is interengageable with composition shingles, the composition shingles being arranged in overlapping rows on an inclined support surface. The system comprises a carrier mountable on a support surface. The carrier comprises a PV laminate support region, a left side edge, a rear edge, a right side edge and a front edge. The edges define a peripheral edge surrounding the PV laminate support region. The carrier also comprises flashing along the peripheral edge. The flashing comprises left side, rear, right side and front flashing along the left side, rear, right side and front edges, respectively. The rear flashing is positionable under a first row of overlapping rows of composition shingles. The left side and right side flashing comprise left side and right side flashing elements, respectively. The left side and right side flashing elements are interengageable with second and third rows of overlapping rows of composition shingles. The front flashing is positionable on top of another row of overlapping rows of composite shingles. The system also includes a PV laminate secured to and supported by the PV laminate support region. In some examples, the carrier defines a ventilation region below the PV laminate. In some examples, the carrier comprises a base and defines a ventilation region between the base and the PV laminate. In some examples, the carrier comprises flexibility means for accommodating support surface irregularities.

An example of an array of integrated composition shingle photovoltaic (PV) systems is interengageable with composition shingles. The composition shingles are arranged in overlapping rows on an inclined roofing surface. Each of a plurality of the systems comprises a carrier mountable on the inclined support surface. The carrier comprises a PV laminate support region, a left side edge, a rear edge, a right side edge and a front edge, said edges defining a peripheral edge surrounding the PV laminate support region. The carrier also comprises flashing along the peripheral edge, the flashing comprising left side, rear, right side and front flashing along the left side, rear, right side and front edges, respectively. The rear flashing is positionable under a first row of overlapping rows of composition shingles. The left side and right side flashing comprises left side and right side flashing elements, respectively. The left side and right side flashing elements are interengageable with second and third rows of overlapping rows of composition shingles. The front flashing is positionable on top of another of the overlapping rows of composite shingles. The system also comprises a PV laminate secured to and supported by the PV laminate support region with the carrier defining a ventilation region below the PV laminate. The front flashing of a first of the PV systems defines an open region and the rear edge of a second of the PV systems comprises a complementary extension whereby the complementary extension of the second of the systems can be received within the open region of the first of the systems. The left side flashing of a third of the systems is interengageable with the right side flashing of the first of the systems.

An example of a photovoltaic (PV) installation comprises an inclined support surface, overlapping rows of composition shingles on the support surface, and an integrated composition shingle photovoltaic (PV) system interengageable with composition shingles. The PV system comprises a carrier mounted on the support surface. The carrier comprises a PV laminate support region, a left side edge, a rear edge, a right side edge and a front edge. The edges define a peripheral edge surrounding the PV laminate support region. The carrier also comprises flashing along the peripheral edge, the flashing comprising left side, rear, right side and front flashing along the left side, rear, right side and front edges, respectively. The rear flashing is positioned under a first of the overlapping rows of composition shingles. The left side and right side flashing comprise left side and right side flashing elements, respectively. The left side and right side flashing elements are interengaged with second and third of the overlapping rows of composition shingles. The first row of composition shingles overlaps the second row of composition singles and the second row of composition shingles overlaps the third row of composition shingles. The front flashing is positioned on top of another of the overlapping rows of composite shingles. The PV system also comprises a PV laminate secured to and supported by the PV laminate support region. Some examples further comprise an array of at least first and second of the PV systems, the front flashing of the first PV system defining an open region, and the rear edge of the second PV system comprising a complementary extension received within the open region of the first PV system. Some examples further comprise an array of at least first and second of the PV systems, the left side flashing of the first PV system being interengaged with the right side flashing of the second PV system.

Other features, aspects and advantages of the present invention can be seen on review the figures, the detailed description, and the claims which follow.

BRIEF DESCRIPTION OF THE DRAWINGS

FIG. 11 is a bottom plan, front view of the PV system of FIG. 1;

DESCRIPTION OF THE SPECIFIC EMBODIMENTS

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

FIGS. 1-15 are several views of an example of an integrated composition shingle photovoltaic (PV) system 10. System 10 is used with a composition shingle roofing installation of the type comprising generally flat, rectangular composition shingles 12 arranged in overlapping rows 16 on a support surface, typically a roofing surface 14. See FIGS. 1 and 1A. System 10 includes broadly a carrier 18 and a PV laminate 20 mounted to the carrier. Carrier 18 is mountable on roofing surface 14, typically using nails in a manner similar to conventional composition shingles. In the example described, carrier 18 is secured directly to roofing surface 14 without any shingles between the carrier and the roofing surface; in other examples PV system 10 and new rows 16 of shingles 12 can be mounted to a roofing surface covered by an existing layer of shingles.

Figure 1:
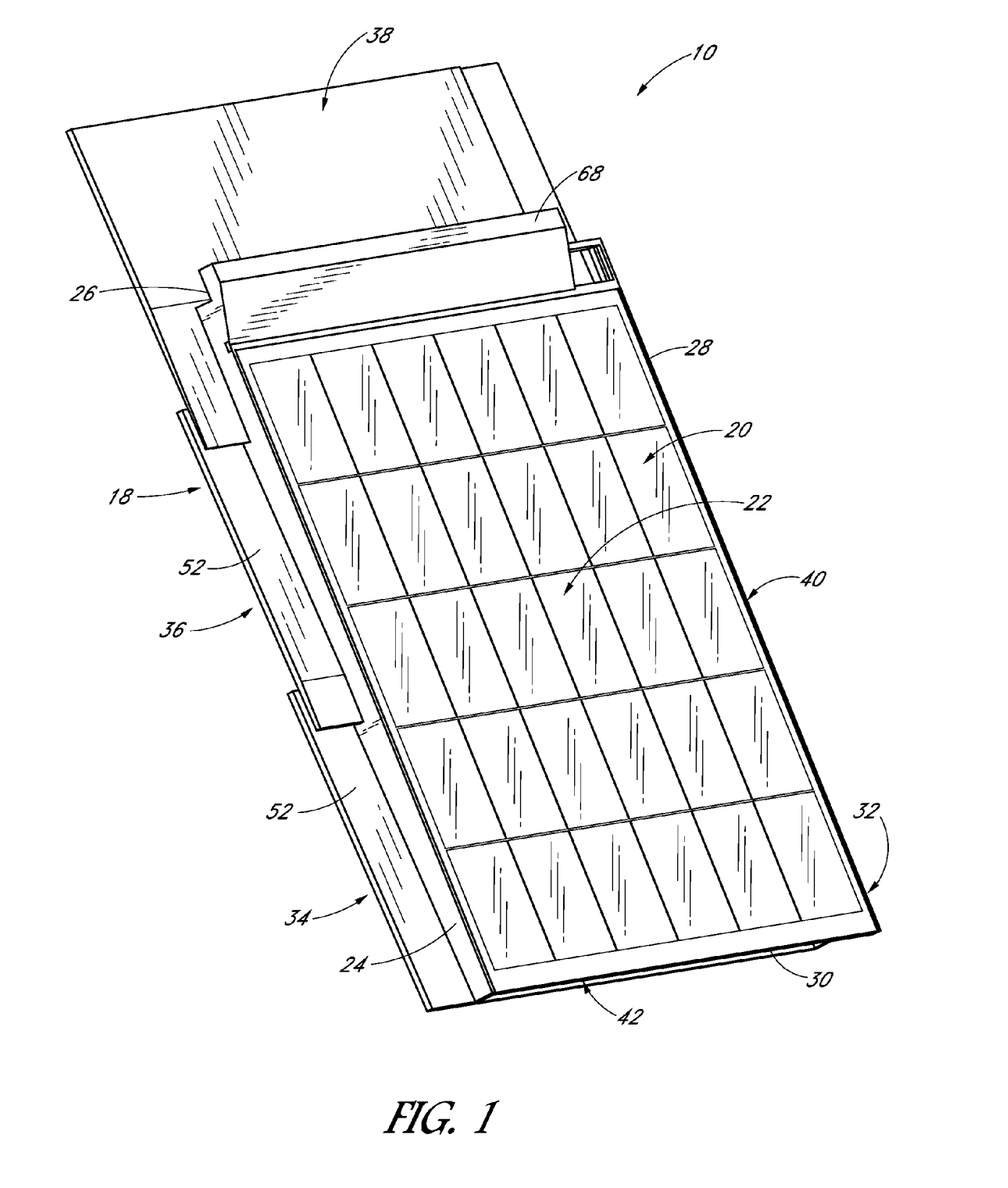
FIG. 1 is a top plan, left side, front view of an integrated composition shingle PV system.
Figure 1A:
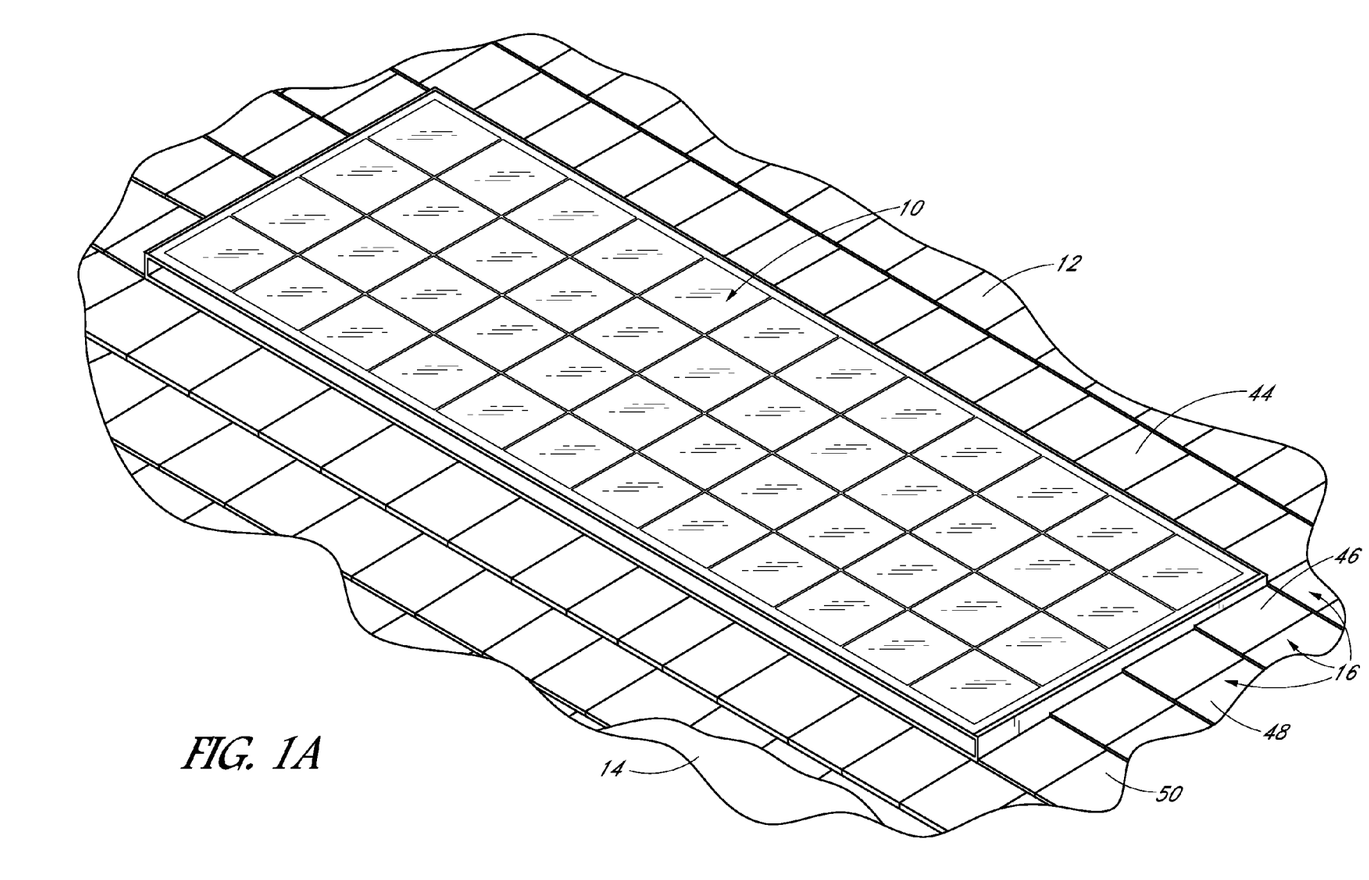
FIG. 1A shows a PV system of FIG. 1 surrounded by an integrated with composition shingles.
Figure 11:
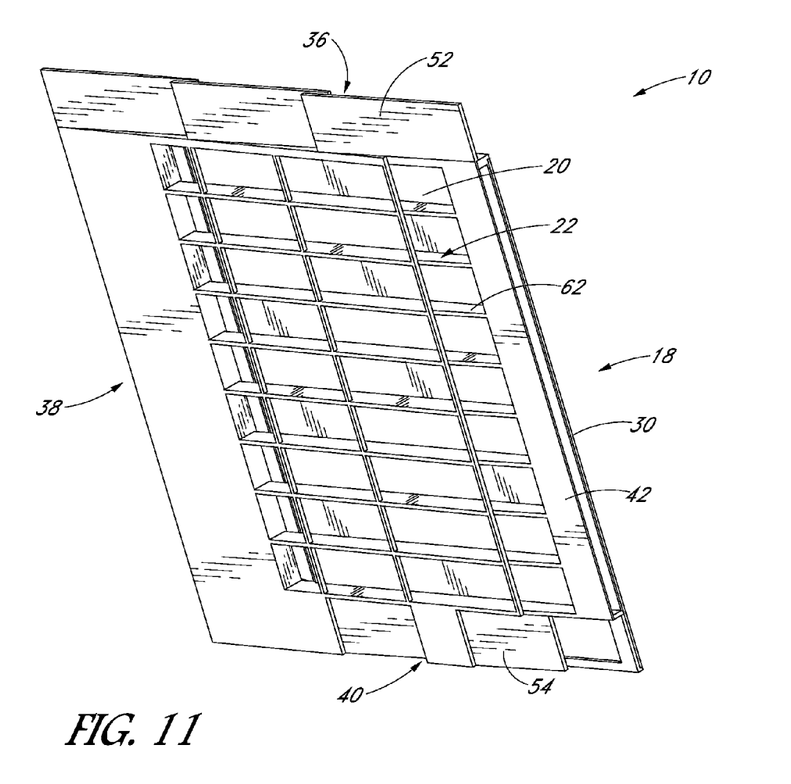
Figure 12:
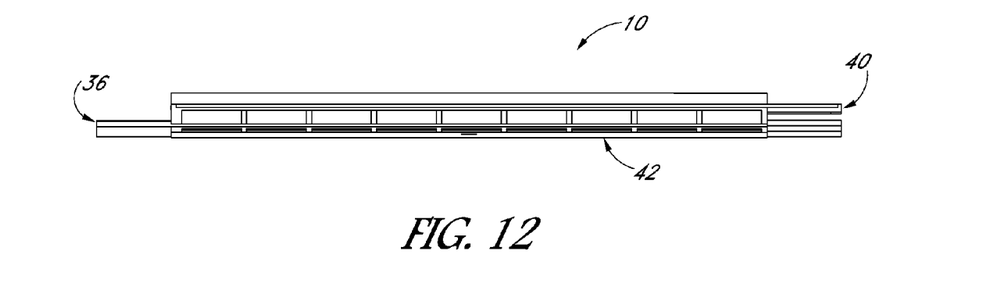
FIG. 12 is a front elevational view of the PV system of FIG. 1.
Figure 13:
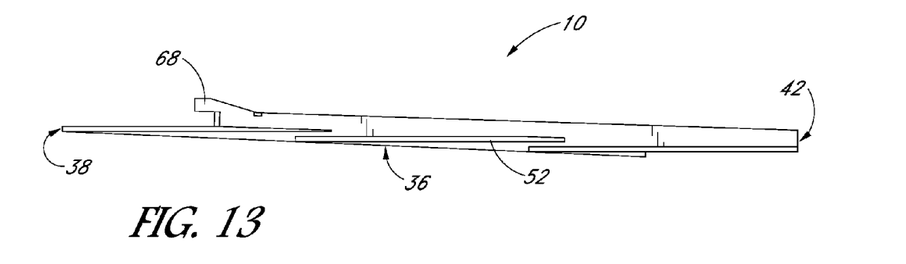
FIG. 13 is a left side elevational view of the PV system of FIG. 1.
Figure 14:
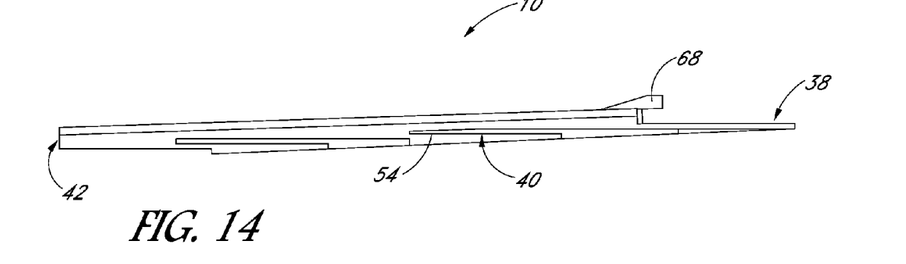
FIG. 14 is a right side elevational view of the PV system of FIG. 1.
Figure 15:
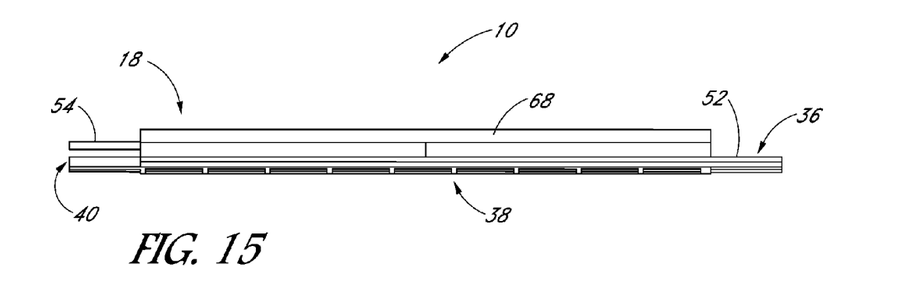
FIG. 15 is a rear elevational view of the PV system of FIG. 1.

Carrier 18 includes a PV laminate support region 22, see FIGS. 1 and 11, a left side edge 24, a rear edge 26, a right side edge 28 and a front edge 30. The edges 24-30 define a peripheral edge 32 surrounding support region 22. Carrier 18 also includes flashing 34 along the peripheral edge 32, the flashing comprising left side flashing 36, rear flashing 38, right side flashing 40 and front flashing 42 along the left side, rear, right side and front edges 24-30, respectively. Each system 10 is typically secured to roofing surface 14 by nailing rear flashing 38 to the roofing surface. Front edge 30 of carrier 18, in this example, overlies the entire front flashing 42. In other examples front flashing 42 could extend outwardly beyond front edge 30 in a manner similar to that of rear flashing 38. Rear flashing 38 is positionable under a first row 44 of the overlapping rows 16 of composition shingles 12.

Left side flashing 36 comprises left side flashing elements 52 interengageable with overlapping rows 46, 48 of composition shingles 12, the first row 44 of composition shingles overlapping the second row 46 of composition singles, the second row 46 of composition shingles 12 overlapping the third row 48 of composition shingles 12, etc. See FIGS. 1A and 3. Similarly, right side flashing 36 comprises right side flashing elements 54 (see FIG. 6) interengageable with overlapping rows 46, 48 of composition shingles 12. Left and right side flashing elements 52, 54 define gaps 55 therebetween (see FIGS. 3 and 5) to accommodate the interengagement. Front flashing 42 is positionable on top of a row 50 of the overlapping rows 16 of composite shingles 12.

Figure 2:
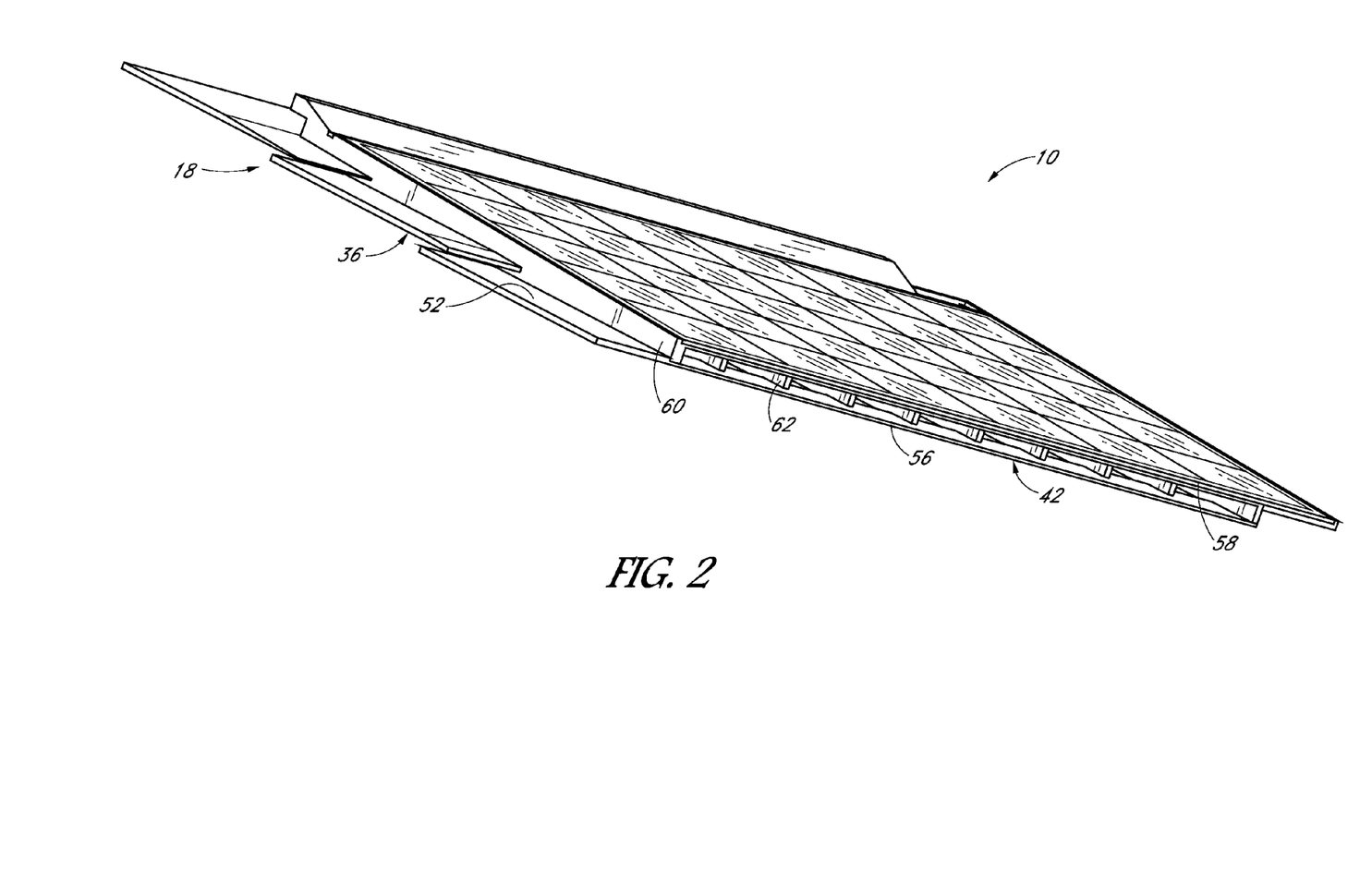
FIG. 2 is a top plan, left side, front view of the PV system of FIG. 1.
Figure 3:
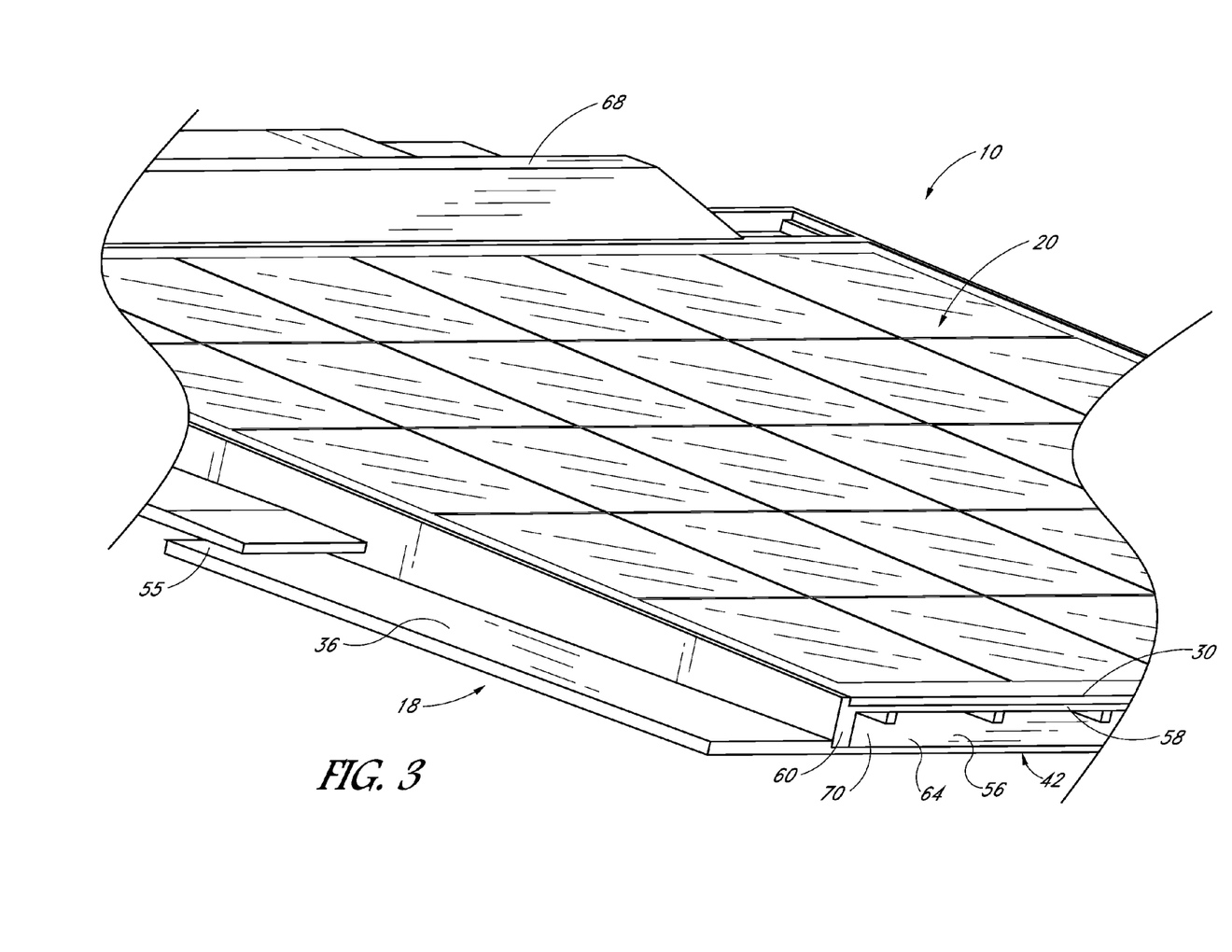
FIG. 3 is an enlarged view of a portion of the PV system of FIG. 2.
Figure 4:
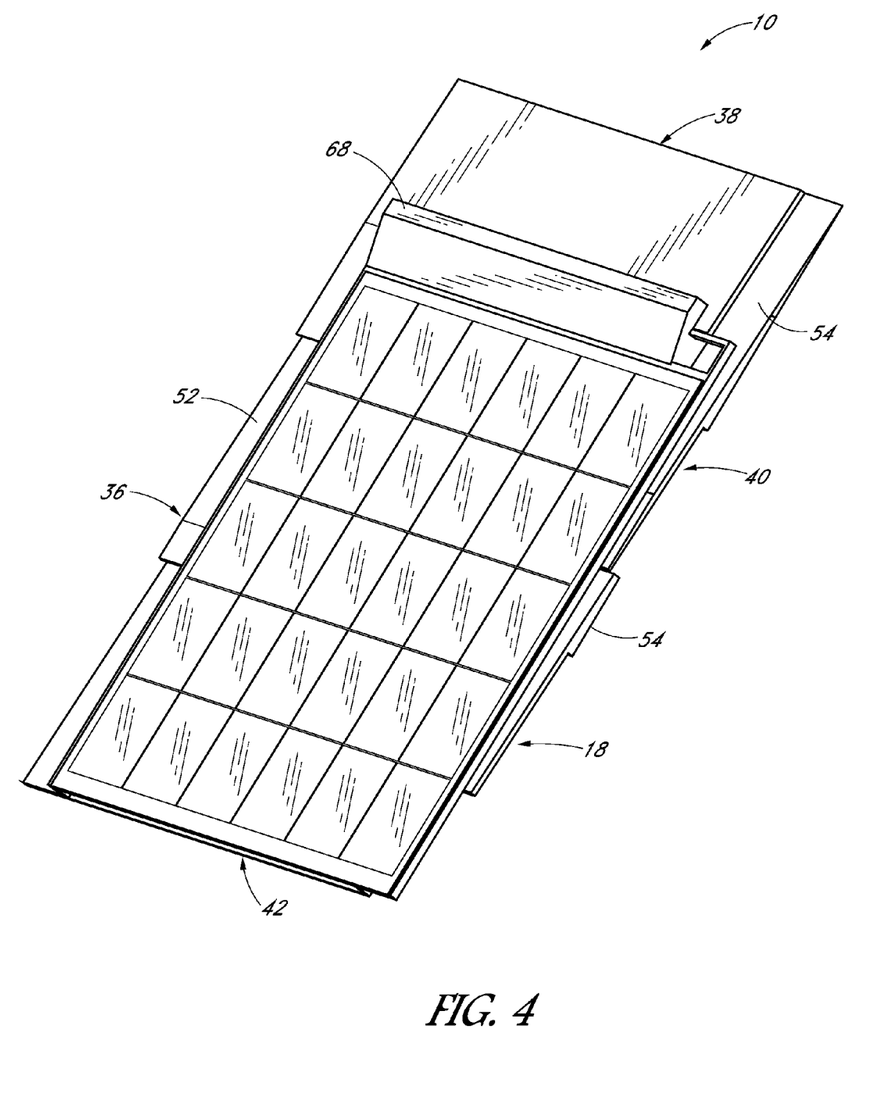
FIG. 4 is a top plan, right side, front view of the PV system of FIG. 1.
Figure 5:
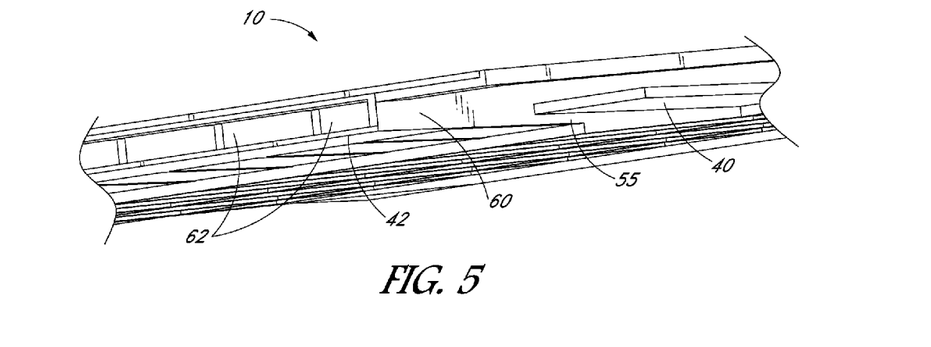
FIG. 5 is an enlarged view of a portion of the PV system of FIG. 1.
Figure 6:
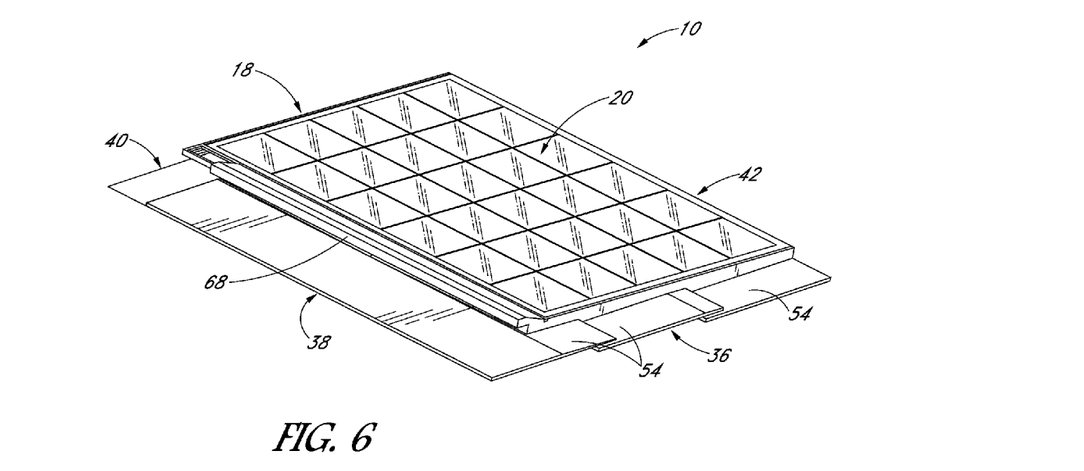
FIG. 6 is a top plan, left side, rear view of the PV system of FIG. 1.
Figure 7:
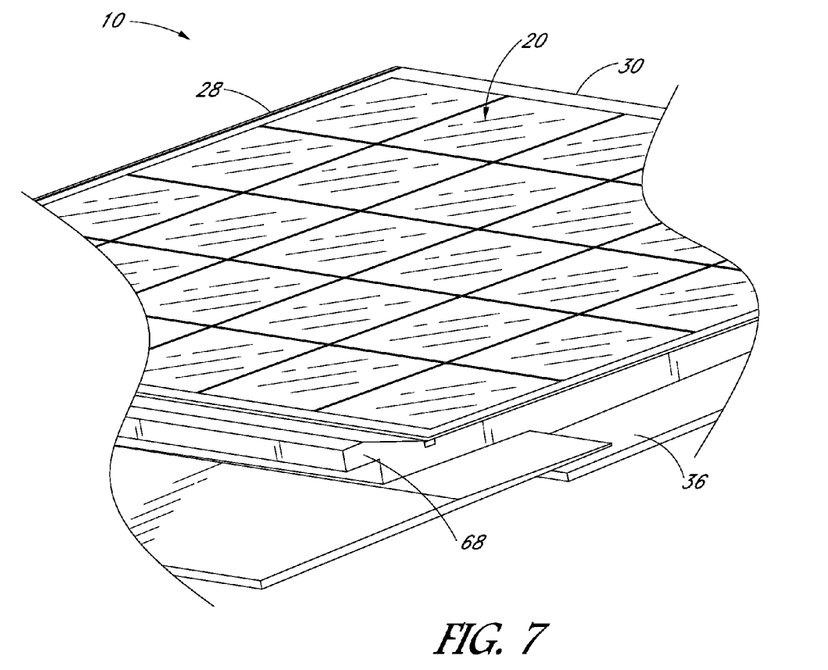
FIG. 7 is an enlarged view of a portion of the PV system of FIG. 6.
Figure 8:
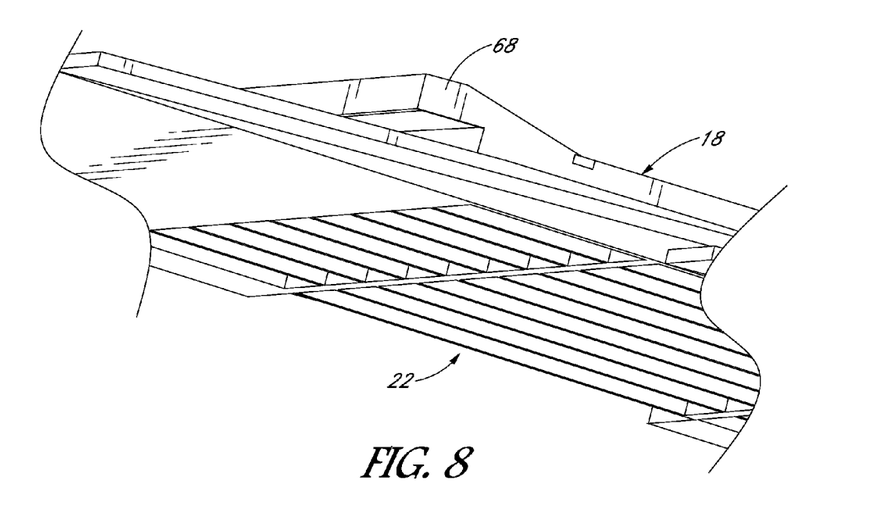
FIG. 8 is an enlarged view of a portion of the PV system of FIG. 6.
Figure 9:
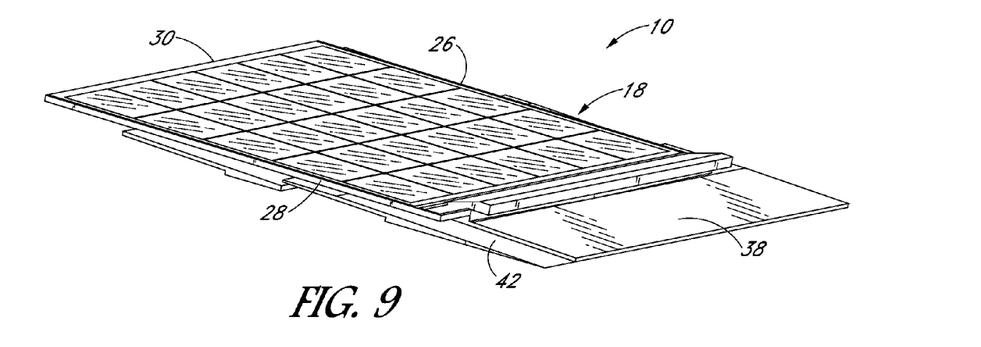
FIG. 9 is a top plan, right side, rear view of the PV system of FIG. 1.
Figure 10:
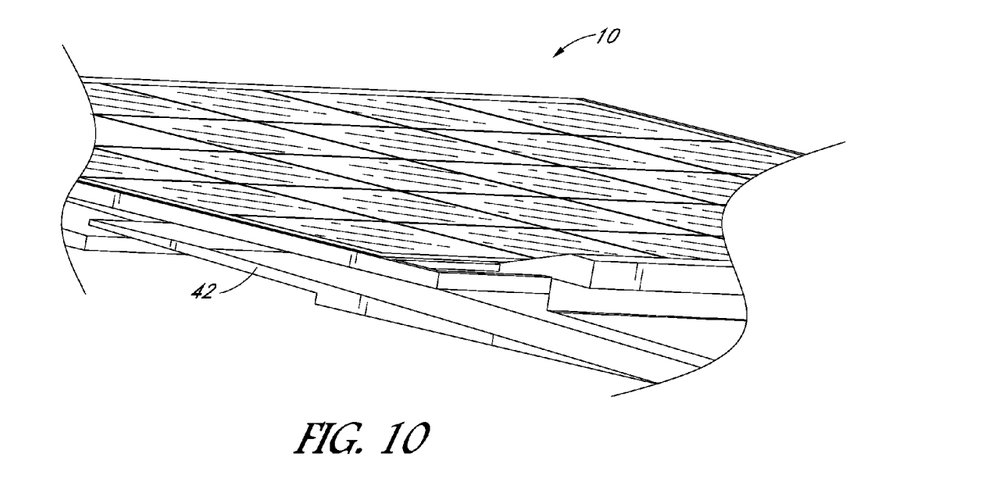
FIG. 10 is an enlarged view of a portion of the PV system of FIG. 9.

As shown in FIGS. 2, 3 and 5, carrier 18 includes a lower base 56, and an upper PV laminate support member 58 supported above the base 56 by side supports 60 and interior supports 62 to define a ventilation region 64 between base 56 and support member 58. Ventilation region 64 provides a ventilation pathway between front edge 30 and rear edge 26. Ventilation region 64 has a height of about 1 inch to 4 inches. When it is desired to provide PV system 10 with a low-profile for enhanced aesthetics, the height of ventilation region 64 can be about ½ inch and still provide some cooling effect for PV laminate 20. Ventilation region 64 also provides an open region for the passage of wires to effectively eliminate the need for creating holes in the roofing surface 14. While it is generally preferred to provide a ventilation region 64, in some situations it may be desired to eliminate the ventilation region (that is, the height of region 64 would be zero) so that PV laminate 20 is effectively flush with roofing surface 14.

In addition to integrating PV system 10 with rows 16 of composition shingles 12, a number of systems 10 can be arranged adjacent to one another as an array of systems 10. Systems 10 can be arranged as rows of systems with the left side flashing elements 52 of one system 10 appropriately engaging the right side flashing elements 54 of an adjacent system 10. To accommodate the inter-engaging shingling of upper and lower rows of systems 10, internal supports 62 are spaced apart from front edge 30 to create an open region 70 (see FIGS. 2 and 3) at the lower end of ventilation region 64. In addition, rear edge 26 has a complementary extension 68 sized to fit within open region 70 with front flashing 42 extending over and supported by rear flashing 38. This inter-engagement helps to weatherproof the junction and permits one PV system 10 to counteract wind uplift forces exerted on adjacent PV system 10.

PV system 10 is suitable for applications that involve either the installation of a new composition shingle roof over a bare roofing surface 14, or installation over existing shingles 12 in conjunction with a re-roof that involves installation of new composition shingles over old ones (a complete re-roof). Installation on an existing composition shingle roof is possible but would require removal of shingles in the array area and care in tying in the waterproofing details in the carrier 18, discussed above, to the remaining shingles. An important point is that the carrier 18 installs in the same manner as conventional composition shingles 12, directly to the roofing surface 14 (whether a new roof or a re-roof). The carrier 18 performs several functions including the following.

The carrier 18 protects the PV laminate 20 in transport, handling, and in use like a conventional PV module frame.

The flashing 34 is integrated into the carrier 18, so that composition shingles 12 can be installed around the array of PV systems 10 in a conventional manner while being properly overlapped and staggered to achieve waterproofing. No additional flashing is required.

The PV system 10 completely eliminates composition shingles 12 where the PV system is installed; it acts as the roof covering.

The carrier 18 can be attached to the roofing surface 14 conventionally as composition shingles are attached (such as with nails) and the penetrations waterproofed similarly (such as with overlapping shingles or another PV system). Thus mechanical attachment can be readily achieved by any roofer.

The carrier 18 can have a larger form factor than typical shingles, reducing cost. The carrier 18 can be made in a number of form factors depending on end-use requirements.

The carrier design allows for the PV laminate 20 to be located flush or substantially flush with the roofing surface 14 or at a chosen standoff distance above the roof to facilitate improved natural ventilation/cooling. This ventilation feature is integrated into the carrier 18 and designed to prevent entry of rain.

Even in the substantially flush embodiment, sufficient room may be provided beneath the laminate 20 for wiring, and the carrier 18 can be designed with wire management features to allow on-roof electrical connection. This space (typically ½" deep in the substantially flush embodiment) also allows for some natural ventilation.

Even with a rigid PV laminate 20, the carrier 18 can be made to be somewhat flexible, so roofing surface irregularities are easily accommodated. With a flexible PV laminate 20, roofing surface irregularities will be no more evident than on a conventional shingled roof.

Walking on an array of PV systems 10 is accommodated as the low-profile does not present a trip hazard (although the surface may still be slippery).

With proper material choices for the carrier material and PV laminate, the system then can be a Class A fire rated roof covering, whereas conventional modules attached on stand-offs are typically Class C fire rated.

PV systems 10 can be designed to behave similarly in wind conditions as conventional composition shingles. That is, it is pressure equalizing and has a low aerodynamic profile. Not having to design for high design pressures allows for a much lighter weight structure. The carrier 18 can be made from, for example, thermoformed, compression molded, or injection molded plastic, composite (plastic/glass), or sheet metal. The carrier 18 incorporates flashing features 34 on all four sides to allow for seamless integration with the surrounding shingles. It also incorporates a ventilation region 64 between the PV laminate 20 and roofing surface 14 for wiring and ventilation. The installation permits flush installation with composition shingles without requiring in-attic wiring and incorporates some ventilation. The PV system 10 provides true building integration in conjunction with asphalt shingles.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims.

Any and all patents, patent applications and printed publications referred to above are incorporated by reference.

What is claimed is:

1. An integrated composition shingle photovoltaic (PV) system interengageable with composition shingles, the composition shingles arranged in overlapping rows on an inclined support surface, the system comprising:
   a carrier mountable on a support surface, the carrier comprising:
      a PV laminate support region;
      a left side edge, a rear edge, a right side edge and a front edge, said edges defining a peripheral edge surrounding the PV laminate support region;
      flashing along the peripheral edge, the flashing comprising left side, rear, right side and front flashing along the left side, rear, right side and front edges, respectively;
      the rear flashing positionable under a first row of overlapping rows of composition shingles;
      the left side and right side flashing comprising left side and right side flashing elements, respectively, the left side and right side flashing elements being spaced to form gaps and so as to interleave with second and third rows of overlapping rows of composition shingles; and
      the front flashing positionable on top of another row of overlapping rows of composite shingles; and
   a PV laminate secured to and supported by the PV laminate support region.

2. The system according to claim 1, wherein the carrier defines a ventilation region below the PV laminate.

3. The system according to claim 1, wherein the carrier comprises a base and defines a ventilation region between the base and the PV laminate.

4. The system according to claim 1, wherein the left side and the right side flashing comprise overlapping left side flashing elements and overlapping the right side flashing elements.

5. An array of the integrated composition shingle PV systems according to claim 1, wherein the front flashing of a first of the systems defines an open region and the rear edge of a second of the systems comprises a complementary extension whereby the complementary extension of the second of the systems can be received within the open region of the first of the systems.

6. An array of the integrated composition shingle PV systems according to claim 1, wherein the left side flashing of a first of the systems is interengageable with the right side flashing of a second of the systems.

7. The system according to claim 1, wherein the carrier comprises flexibility means for accommodating support surface irregularities.

8. An array of the integrated composition shingle photovoltaic (PV) systems interengageable with composition shingles, the composition shingles arranged in overlapping rows on an inclined roofing surface, each of a plurality of the systems comprising:
   a carrier mountable on an inclined support surface, the carrier comprising:
      a PV laminate support region;
      a left side edge, a rear edge, a right side edge and a front edge, said edges defining a peripheral edge surrounding the PV laminate support region;
      flashing along the peripheral edge, the flashing comprising left side, rear, right side and front flashing along the left side, rear, right side and front edges, respectively;
      the rear flashing positionable under a first row of overlapping rows of composition shingles;
      the left side and right side flashing comprising left side and right side flashing elements, respectively, the left side and right side flashing elements being spaced so as to form gaps and so as to interleave with second and third rows of overlapping rows of composition shingles; and
      the front flashing positionable on top of another of the overlapping rows of composite shingles;
   a PV laminate secured to and supported by the PV laminate support region;
   the carrier defining a ventilation region below the PV laminate;
   the front flashing of a first of the PV systems defines an open region and the rear edge of a second of the PV systems comprises a complementary extension whereby the complementary extension of the second of the systems can be received within the open region of the first of the systems; and
   the left side flashing of a third of the systems is interengageable with the right side flashing of the first of the systems.

9. The system according to claim 8, wherein the carrier comprises flexibility means for accommodating roofing surface irregularities.

10. A photovoltaic (PV) installation comprising:
   an inclined support surface;
   overlapping rows of composition shingles on the support surface;
   an integrated composition shingle photovoltaic (PV) system interengageable with composition shingles, the PV system comprising:
      a carrier mounted on the support surface, the carrier comprising:
         a PV laminate support region;
         a left side edge, a rear edge, a right side edge and a front edge, said edges defining a peripheral edge surrounding the PV laminate support region;
         flashing along the peripheral edge, the flashing comprising left side, rear, right side and front flashing along the left side, rear, right side and front edges, respectively;
         the rear flashing positioned under a first of the overlapping rows of composition shingles;
         the left side and right side flashing comprising left side and right side flashing elements, respectively, the left side and right side flashing elements being interleaved with second and third of the overlapping rows of composition shingles, the first row of composition shingles overlapping the second row of composition singles and the second row of composition shingles overlapping the third row of composition shingles; and
         the front flashing positioned on top of another of the overlapping rows of compositioned shingles; and
      a PV laminate secured to and supported by the PV laminate support region.

11. The PV installation according to claim 10, further comprising:
   an array of at least first and second of the PV systems;
   the front flashing of the first PV system defining an open region;
   the rear edge of the second PV system comprising a complementary extension received within the open region of the first PV system.

12. The PV installation according to claim 10, further comprising:
   an array of at least first and second of the PV systems;
   the left side flashing of the first PV system is interengaged with the right side flashing of the second PV system.

* * * * *